(12) United States Patent
Burkert et al.

(10) Patent No.: US 7,172,058 B2
(45) Date of Patent: Feb. 6, 2007

(54) VIBRATION DAMPER WITH AMPLITUDE-DEPENDENT DAMPING FORCE

(75) Inventors: Gunnar Burkert, Leingarten (DE); Andreas Förster, Schweinfurt (DE); Heinz-Joachim Gilsdorf, Donnersdorf (DE); Hans Gonschorrek, Bergrheinfeld (DE); Frank MacKert, Bergrheinfeld (DE); Thomas Kiefer, Schweinfurt (DE); Klaus Sauer, Röthlein (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/993,614

(22) Filed: Nov. 19, 2004

(65) Prior Publication Data

US 2005/0109571 A1    May 26, 2005

(30) Foreign Application Priority Data

Nov. 20, 2003   (DE)  ............................... 103 54 333
Oct. 1, 2004    (DE)  ..................... 10 2004 047 778

(51) Int. Cl.
     *F16F 9/00*    (2006.01)

(52) U.S. Cl. ............ 188/315; 188/322.22; 188/322.15; 188/318

(58) Field of Classification Search ................ 188/275, 188/280, 282.1, 282.9, 288, 316, 317, 318, 188/322.13, 322.15, 322.14, 322.22, 314, 188/315

See application file for complete search history.

(56) References Cited

U.S. PATENT DOCUMENTS 3,724,615 A    4/1973  Stormer
4,535,877 A *  8/1985  Shimokura ................ 188/282.4
4,747,475 A    5/1988  Hagwood et al.
5,570,763 A   11/1996  Parejo
6,371,262 B1   4/2002  Katou et al.
6,561,326 B2 * 5/2003  Gotz ...................... 188/322.15
2001/0037922 A1 11/2001  Gotz
2002/0108826 A1* 8/2002  Miller et al. ................. 188/280
2002/0121415 A1* 9/2002  Hartel ....................... 188/282.2
2005/0133319 A1* 6/2005  Wilhelm ...................... 188/281

FOREIGN PATENT DOCUMENTS

| DE | 35 34 298  | 4/1987  |
| DE | 41 09 377  | 7/1992  |
| DE | 100 47 878 | 11/2001 |
| EP | 1 152 166  | 11/2001 |
| GB | 2 180 320  | 3/1987  |

* cited by examiner

*Primary Examiner*—Devon Kramer
(74) *Attorney, Agent, or Firm*—Cohen Pontani Lieberman & Pavane LLP

(57) ABSTRACT

Vibration damper with amplitude-dependent damping force includes a cylinder, in which a piston rod, carrying a piston, is guided with freedom of axial movement, where the piston divides the cylinder into a working space on the piston rod side and a working space on the side away from the piston rod. The piston rod carries at least part of a housing, which is mounted in the direction of the piston rod-side working space, and where a separating body is supported inside the housing with freedom to slide. The separating body divides the housing into first and second working chambers, where the first working chamber is connected by at least one radial connecting opening to the piston rod-side working space and the second working chamber is connected by a connecting channel to the working space on the side away from the piston rod. At least a part of the housing is connected to the piston rod by a weld.

15 Claims, 3 Drawing Sheets

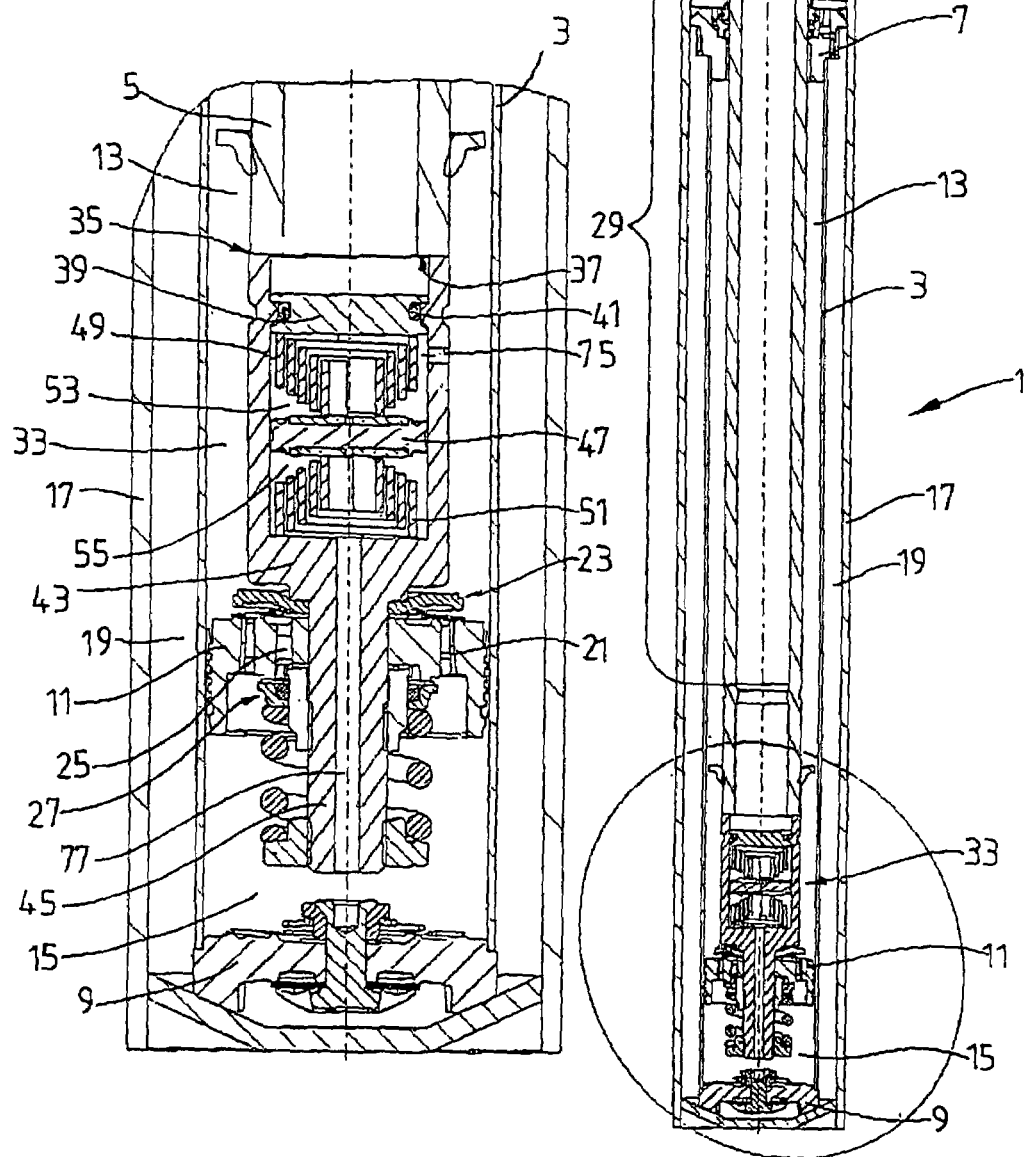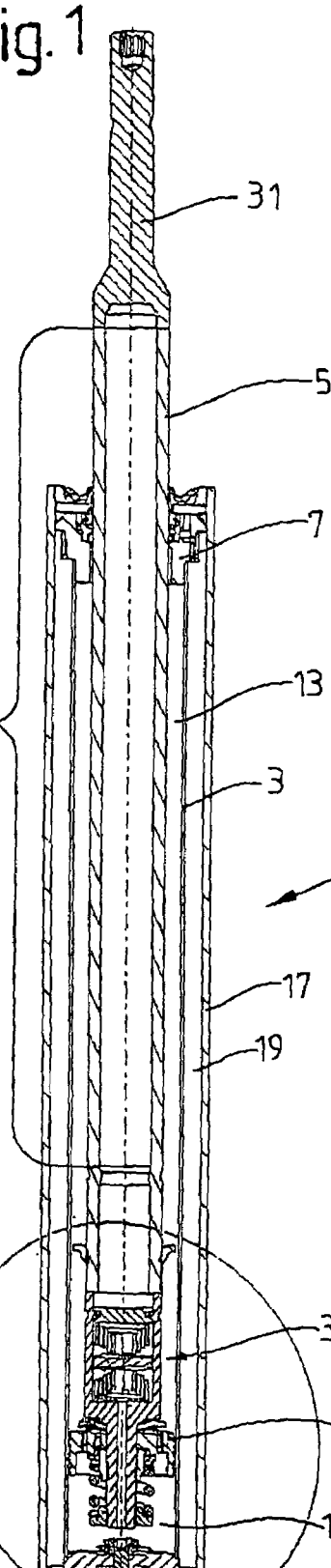

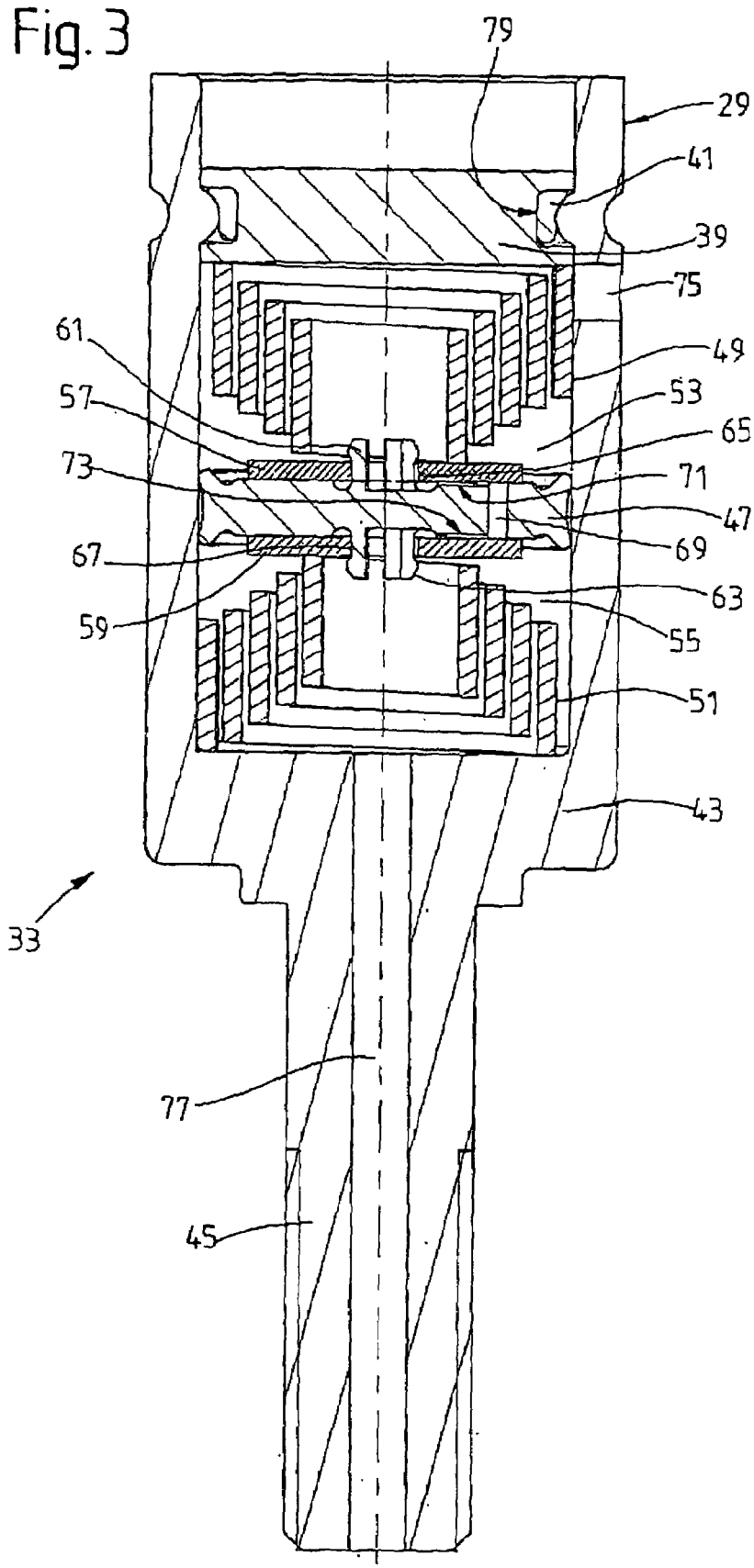

VIBRATION DAMPER WITH AMPLITUDE-DEPENDENT DAMPING FORCE

BACKGROUND OF THE INVENTION

1. Field of the Invention

The invention pertains to a vibration damper with amplitude-dependent damping force including a cylinder; a piston rod which is axially movable in the cylinder; a housing having a tubular part and a bottom part, wherein the tubular part is connected to the piston rod; and a piston carried by the bottom part, the piston dividing the cylinder into a working space on the piston rod side of the piston and a working space away from the piston rod. A separating body, which is supported inside the housing with freedom to move axially, divides the housing into first and second working chambers. A radial connecting opening connects the first working chamber to the working space on the piston rod side, and a connecting channel connects the second working chamber to the working space away from the piston rod.

2. Description of the Related Art

A vibration damper with amplitude-dependent damping force is known from U.S. Pat. No. 6,561,326. This damper has a housing, which is attached to the piston rod above the piston. A spring-supported separating piston is installed inside the housing. The housing has radial connecting openings leading to a working space on the piston rod side of the piston and also an axial connecting channel passing through a piston rod pin to a working space on the side of the piston away from the piston rod. The advantage of arranging the housing in the piston-rod side working space in comparison with installing it in the working space on the side away from the piston rod is said to be that the dimensions thus become more compact. When the design according to FIG. 3 is considered under the aspect of the amount of axial space required, however, the alleged advantage of shorter length does not come into play, because the threaded joint has a larger outside diameter than the rest of the piston rod, which means that the length of the housing must continue to be considered a preload length for the travel of the piston rod, i.e. the housing limits the distance the piston rod can travel.

SUMMARY OF THE INVENTION

The task of the present invention is to realize a vibration damper with amplitude-dependent damping force in which the piston rod has the largest possible stroke.

This task is accomplished according to the invention by welding at least part of the housing to the piston rod.

The great advantage of the invention consists in that there is no need for any axial overlap between the housing and the piston rod to cover, for example, a threaded joint. As a result, the very good overall stroke length of the piston rod remains preserved.

The weld can be produced especially advantageously by means of a friction-welding method. This welding method is inexpensive, and in addition only a very small area of the piston rod is heated. No weld spatters are created either; at most, a small amount of material is ejected, which can be very easily removed later.

In a further advantageous embodiment of the invention, the housing has the same outside diameter over at least a certain portion of its length as the adjacent part of the piston rod. In theory, the piston rod could travel outward until the piston makes contact with the piston rod guide of the vibration damper, so that, in comparison to a conventional vibration damper, there would no absolutely no disadvantage with respect to the amount of space required.

It is also provided that the piston rod is hollow. As a result, it is possible for the piston rod itself to represent a certain percentage of the volume of the working chambers of the housing.

According to an advantageous embodiment, the housing is separated from the hollow piston rod by an axially fixed disk. If then, in addition, the axially fixed disk is mounted inside the housing, it becomes possible to test the functionality of the housing, together with the components which produce the amplitude-dependent damping force, independently of the other components of the vibration damper.

It is also possible for the piston rod to have a tubular center section. The housing is adjacent to one end of this section, whereas a sealing piece is adjacent to the other end. It is then possible to test the amplitude-dependent damping force through the open end of the piston rod, and if the test is successful, the disk can then be fixed in place in the housing. As an alternative, the hollow piston rod can form the tubular part of the housing, and the bottom of the housing can be welded onto it, The piston rod does not have to be completely hollow; it can instead have a blind hole to accommodate the working chambers.

The separating body inside the housing is preferably made of plastic and is provided with stiffening disks. This design offers the possibility that the working chambers of the housing can be separated from each other directly, without the need for a separate ring seal.

So that the separating body can be installed as easily as possible and so that it can withstand large compressive loads, the separating body is provided with latching means, which enter into latching connection with the stiffening disks.

The damping medium can absorb air and release it again as a function of the pressure and temperature conditions inside the vibration damper. The gas bubbles which form during the release of the air could collect inside the housing. So that this does not occur, the separating body has a vent opening.

For production reasons, the vent opening has an axial channel, to which transverse channels are connected. The cross sections of these transverse channels are much smaller than that of the axial channel.

Thus the transverse channels are provided in the top and bottom surfaces of the separating body and are covered by the stiffening disks. If the separating body is made of plastic, transverse channels with accurate dimensions can be very easily produced by injection molding. They are then covered by the stiffening disks.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 1 shows a complete cross section of the vibration damper;

FIG. 2 shows a partial view in the area of the housing mounted on the piston rod;

FIG. 3 shows the housing of FIG. 2 in greater detail;

DETAILED DESCRIPTION OF THE PRESENTLY PREFERRED EMBODIMENTS

Figures 4A, 4B:
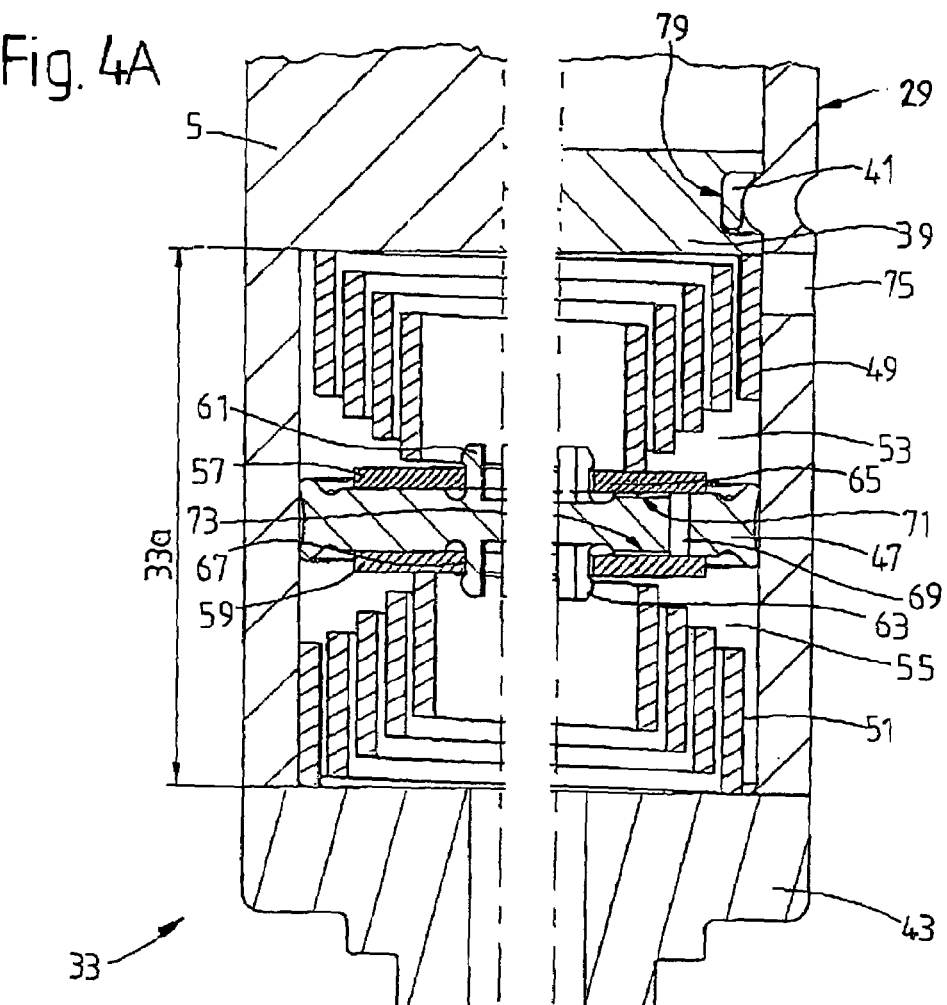
FIG. 4A is a partial axial section showing a tubular housing part formed integrally with a solid piston rod.
FIG. 4B is a partial axial section showing a tubular housing part formed integrally with a hollow piston rod.

FIG. 1 shows a vibration damper 1 in the form of a spring strut unit, although the invention can be used independently of the type of damper. Inside a cylinder 3, a piston rod 5 is guided with freedom of axial movement, A piston rod guide 7 at one end and a bottom valve 9 at the other end of the cylinder 3 form the boundaries of a working space completely filled with damping medium. A piston 11, attached to the piston rod, divides this space into a working space 13 on the piston-rod side and a space 15 on the side away from the piston rod. Concentric to the cylinder, a container tube 17 is provided, which, together with the outside wall of the cylinder, forms a ring-shaped compensating space 19, only partially filled with damping medium, to accommodate the volume displaced from the working space 15 on the side away from the piston rod by the inward travel of the piston rod.

As can be seen in FIG. 2, the piston 11 has through-channels 21 for a first damping valve 23 operative during inward travel and through-channels 25 for a second damping valve 27 operative during the outward travel of the piston 11 and of the piston rod 5.

The piston rod 5 is hollow and has several sections. A sealing piece 31 is connected outside the cylinder to an end of tubular center section 29. The end facing in the direction of the working space 15 on the side away from the piston rod is formed by a housing 33, which is connected by a weld 35 to the open end of the piston rod 5. The weld is preferably produced by a friction welding method, so that the heat which is generated affects only the welding zone itself; the amount of heat generated is not sufficient to act on the piston rod, for example, and possibly distort it. The sealing piece 31 and the tubular center section 29 can be completely machined and even chrome-plated before the production of the weld. The end surface 37 designed to accept the weld is isolated by suitable measures during the chrome-plating operation to prevent the occurrence of inclusions, which could impair the quality of the weld. The welded-on housing does not have to be chrome-plated, because this area of the piston rod, after assembly, always remains inside the vibration damper and is protected by the damping medium against corrosion.

Axially, the housing 33 is separated from the hollow piston rod 5 by an axially fixed disk 39 acting in conjunction with a ring seal 41. At the other end, a bottom part 43 closes off the housing; this bottom part also carries a pin 45, on which the piston 11 can be seated. The housing 33 is thus mounted between the piston 11 and the tubular intermediate section 29 of the piston rod 5. The housing 33 can have the same outside diameter, at least along a certain part of its length, as the adjacent part of the piston rod 5, so that, in the extreme case, the piston could travel all the way out to the piston rod guide 7.

Inside the housing 33, a separating body 47 is supported with freedom to slide up and down. This separating body is held in a predetermined position by a first and a second spring arrangement 49, 51, and as a result the housing 33 is divided into a first and a second working chamber 53, 55. The two spring arrangements can be supported axially against the axially fixed disk 39 and the bottom part 43 of the housing 33. In this exemplary embodiment, the spring arrangements are formed by conical springs, although springs of other types could also be used.

The separating body 47 is preferably made of plastic and is provided on its top and bottom surfaces with stiffening disks 57, 59, which ensure that the forces of the first and second spring arrangements 49, 51 are introduced uniformly to the body. Latches 61, 63 in the form of expansion anchors are provided on the separating body; these latches cooperate with through-holes 65, 67 in the stiffening disks to create a latching connection (FIG. 3). In addition, the separating body also has at least one vent opening for the sake of the housing. This opening comprises an axial channel 69, to which transverse channels 71, 73 on the top and bottom surfaces of the separating body are connected, which in turn are covered by the stiffening disks. The cross sections of the transverse channels 71, 73 are much smaller than that of the axial channel 69, so that, although gas can flow relatively easily between the two working chambers 53, 55, only an insignificant amount of damping medium is exchanged.

The first working chamber 53 is connected by at least one radial connecting opening 75 to the working space 13 on the piston-rod side, and the second working chamber 55 is connected by an axial connecting channel 77 to the working space 15 on the side away from the piston rod (FIG. 2).

When, for example, the piston rod travels a short distance in the outward direction, damping medium flows into the through-channel 25 for the second damping valve 27, the valve body of which closes the through-channel 25, leaving at most a very small pilot cross section open. At the same time, the damping medium present in the first working chamber 53 of the housing is increased by medium admitted via the radial connecting opening 75 and thus presses the separating body 47, in opposition to the force of the second spring arrangement 51, toward the bottom part 43 of the housing 33. Thus damping medium is displaced from the second working chamber 55 of the housing 33 via the axial connecting channel 77 into the working space 15 on the side away from the piston rod. Once the second spring arrangement 51 has traveled as far as it can, the second damping valve 27 opens, so that the two working spaces 13, 15 are now connected to each other.

When the piston 11 travels inward, a backpressure on the separating body 47 builds up inside the second working chamber 55 via the axial connecting channel 77; this backpressure has the effect of displacing the separating body 47 axially against the first spring arrangement 49 inside the first working chamber 53, as a result of which damping medium can escape from the first working chamber 53 via the minimum of one radial connecting opening 75 and thus enter the working space 13 on the piston rod side. The amplitude-dependent damping force of the vibration damper is adjusted by increasing or decreasing the size of the working chambers 53, 55 and the forces of the spring arrangements 48, 51.

It can be seen in FIG. 3 that, because the axially fixed disk 39 is mounted inside the housing 33, the housing 33 forms a structural unit independent of the piston rod 5. This means that this structural unit can be clamped in a device with a support plunger and its functionality tested through the axial connecting channel 77 and the radial connecting opening 75. If the measured pressures or forces are within the desired tolerances, the disk 39 can be fixed in place in the housing 33 by the use of radial crimps. For this purpose, the disk has a circumferential groove 79, to the base of which the sealing ring 41 is clamped. This same test can also be performed while the piston 11 is mounted on the piston rod pin 5 so that, for example, it would be possible to change the pretension of the first and second spring arrangements 49, 51 to compensate for tolerance errors of the pilot cross section.

FIGS. 4A and 4B show modifications of the design of the housing 33 in comparison with that shown in FIG. 3. The function is identical. The tubular section 33a of the housing 33 is formed by the hollow piston rod 5 on the center section 29, and the bottom part 43 of the housing 33 is welded onto it. FIG. 4A shows a piston rod 5 of solid material, where a blind hole is provided in the end for the two working chambers 53, 55. FIG. 4B shows a piston rod with a tubular center section 29 and a welded-on bottom. The variant shown on the right can also be used for the testing method according to FIG. 3, because the support plunger for the disk yet to be installed can be introduced through the other end, which is still open, because the sealing piece has not yet been attached. As a function of the surface quality of the tubular piston rod 5, it may be necessary to use a metal-cutting process to smooth the inside diameter in the area of the working chambers 53, 55. If the piston rod with the weld is intended to travel outward as far as the piston rod guide 7, a final surface treatment may be necessary, so that there are no shoulders on the piston rod 5 which could damage the piston rod guide.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A vibration damper with amplitude dependent damping force, said vibration damper comprising:
    a cylinder;
    a piston rod which is axially movable in the cylinder;
    a housing having a tubular part and a bottom part, wherein the tubular part is connected to said piston rod and has the same outside diameter as said piston rod;
    a piston carried by the bottom part, the piston dividing the cylinder into a working space on a piston rod side of the piston and a working space away from the piston rod;
    a separating body supported inside the housing with freedom to move axially, said separating body dividing the housing into first and second working chambers;
    a radial connecting opening connecting the first working chamber to the working space on the piston rod side; and
    a connecting channel connecting the second working chamber to the working space away from the piston rod;
    wherein said tubular part is connected to one of said piston rod and said bottom part by a weld.

2. The vibration damper of claim 1 wherein the piston rod is hollow.

3. The vibration damper of claim 2 wherein the hollow piston rod has an interior, the vibration damper further comprising an axially mounted disk separating said first working chamber from the interior of said hollow piston rod.

4. The vibration damper of claim 3 wherein said disk is mounted inside the housing.

5. The vibration damper of claim 1 wherein said piston rod comprises a tubular center section having opposite ends, said housing being adjacent to one of said ends, said damper further comprising a sealing piece sealing the other of said ends.

6. The vibration damper of claim 2 wherein the tubular part of the housing is an extension of the hollow piston rod, the bottom part being welded to the tubular part.

7. The vibration damper of claim 1 wherein said separating body is made of plastic, said damper further comprising stiffening disks assembled against said separating body.

8. The vibration damper of claim 7 wherein said separating body comprises axially opposed latches for retaining said disks.

9. The vibration damper of claim 1 wherein said separating body comprises a vent opening.

10. The vibration damper of claim 9 wherein said separating body comprises a through channel and a pair of transverse channels, said through channel having a cross section which is greater than the cross section of the transverse channels.

11. The vibration damper of claim 10 further comprising stiffening disks assembled against the separating body over the transverse channels.

12. The vibration damper of claim 1 further comprising a piston rod guide fitted in an end of the cylinder, the housing forming an extension of the piston rod which can be received in the guide.

13. The vibration damper of claim 1 wherein said tubular part is formed as one piece with said bottom part, and is connected to said piston rod by a weld.

14. The vibration damper of claim 1 wherein said tubular part is formed as one piece with said piston rod, and is connected to said bottom part by a weld.

15. The vibration damper of claim 1 wherein said weld is a friction weld.

* * * * *